(12) United States Patent
Bazbaz et al.

(10) Patent No.: US 10,676,242 B2
(45) Date of Patent: *Jun. 9, 2020

(54) EASY ACCESS WOVEN PLASTIC BAGS

(71) Applicant: Polytex Fibers Corporation, Houston, TX (US)

(72) Inventors: Jacobo Bazbaz, Bellaire, TX (US); Alberto Zaroli, Katy, TX (US)

(73) Assignee: Polytex Fibers Corporation, Houston, TX (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/894,257

(22) Filed: Feb. 12, 2018

(65) Prior Publication Data

US 2018/0162598 A1 Jun. 14, 2018

Related U.S. Application Data

(63) Continuation of application No. 14/159,737, filed on Jan. 21, 2014, now Pat. No. 9,926,106.

(Continued)

(51) Int. Cl.
*B65D 75/58* (2006.01)
*B65D 30/08* (2006.01)
(Continued)

(52) U.S. Cl.
CPC ............... *B65D 29/02* (2013.01); *B32B 1/02* (2013.01); *B32B 3/266* (2013.01); *B32B 5/022* (2013.01); *B32B 5/08* (2013.01); *B32B 5/26* (2013.01); *B32B 7/12* (2013.01); *B32B 27/00* (2013.01); *B32B 27/08* (2013.01); *B32B 27/10* (2013.01); *B32B 27/12* (2013.01); *B32B 27/32* (2013.01); *B32B 27/34* (2013.01); *B32B 27/36* (2013.01);

(Continued)

(58) Field of Classification Search
CPC ......................... B65D 75/58; B65D 75/5805; B65D 75/5811; B65D 75/5816; B65D 75/5822; B65D 75/5827; B65D 75/5833; B65D 75/5838; B65D 75/5844
USPC ............................... 383/200, 201, 203–209
See application file for complete search history.

(56) References Cited

U.S. PATENT DOCUMENTS

| 2,634,896 A | 4/1953 | Graveno |
| 2,991,000 A | 7/1961 | Spees |

(Continued)

FOREIGN PATENT DOCUMENTS

| CA | 2269652 | 4/2000 |
| EP | 1035028 | 9/2000 |

(Continued)

OTHER PUBLICATIONS

International Search Report and Written Opinion; PCT/US2014/012276 dated May 7, 2014.

*Primary Examiner* — Jes F Pascua
*Assistant Examiner* — Nina K Attel
(74) *Attorney, Agent, or Firm* — Vinson & Elkins L.L.P.

(57) ABSTRACT

A woven laminated plastic bag having a weakened portion is provided. The weakened portion is generally defined by a plurality of perforations in the bag. In various aspects the bag can be fabricated from woven polypropylene and/or polyethylene layer which can be laminated with a film layer, can form a pinch bottom bag, and can have one or both sides include graphics and/or printing. The bag can also provide a top end and/or a bottom end either or both of which provide a discrete area which may contain discrete graphics and/or printing.

21 Claims, 4 Drawing Sheets

Related U.S. Application Data

(60) Provisional application No. 61/755,322, filed on Jan. 22, 2013.

(51) Int. Cl.

| | | |
|---|---|---|
| *B32B 27/00* | (2006.01) | |
| *B32B 27/10* | (2006.01) | |
| *B32B 27/34* | (2006.01) | |
| *B32B 3/26* | (2006.01) | |
| *B32B 27/12* | (2006.01) | |
| *B32B 7/12* | (2006.01) | |
| *B32B 27/32* | (2006.01) | |
| *B32B 1/02* | (2006.01) | |
| *B32B 29/02* | (2006.01) | |
| *B32B 5/26* | (2006.01) | |
| *B32B 5/08* | (2006.01) | |
| *B32B 5/02* | (2006.01) | |
| *B32B 27/36* | (2006.01) | |
| *B32B 27/08* | (2006.01) | |
| *B65D 30/20* | (2006.01) | |

(52) U.S. Cl.
CPC ............. *B32B 29/02* (2013.01); *B65D 31/02* (2013.01); *B65D 75/5827* (2013.01); *B65D 75/5866* (2013.01); *B32B 2250/02* (2013.01); *B32B 2250/03* (2013.01); *B32B 2255/12* (2013.01); *B32B 2262/0253* (2013.01); *B32B 2262/0276* (2013.01); *B32B 2262/14* (2013.01); *B32B 2307/514* (2013.01); *B32B 2307/518* (2013.01); *B32B 2439/46* (2013.01); *B65D 31/10* (2013.01)

(56) References Cited

U.S. PATENT DOCUMENTS

| | | |
|---|---|---|
| 3,058,647 A | 10/1962 | Reiselt |
| 3,203,620 A | 8/1965 | Becker |
| 3,285,498 A | 11/1966 | Becker |
| 3,508,701 A | 4/1970 | Saito |
| 3,648,922 A | 3/1972 | Gebo |
| 3,650,460 A | 3/1972 | Lokey |
| 3,685,720 A | 8/1972 | Brady |
| 3,687,356 A | 8/1972 | Goodrich |
| 3,990,626 A | 11/1976 | Goodrich |
| 4,008,850 A | 2/1977 | Goodrich |
| 4,142,667 A | 3/1979 | Runo |
| 4,292,332 A | 9/1981 | McHam |
| 4,441,613 A | 4/1984 | Hain et al. |
| 4,460,091 A | 7/1984 | Ham |
| 4,480,752 A | 11/1984 | Jacobs |
| 4,512,479 A | 4/1985 | Ham |
| 4,515,273 A | 5/1985 | Jacobson |
| 4,557,385 A | 12/1985 | Robinson |
| 4,567,987 A | 2/1986 | Lepisto |
| 4,610,651 A | 9/1986 | Jacobson |
| 4,768,654 A | 9/1988 | Jacobs |
| 4,785,940 A | 11/1988 | Wilson |
| 4,811,849 A | 3/1989 | Rausing |
| 4,836,378 A | 6/1989 | Lephardt |
| 4,955,981 A | 9/1990 | Provost |
| 5,048,692 A | 9/1991 | Handler et al. |
| 5,188,235 A | 2/1993 | Pierce et al. |
| 5,217,307 A | 6/1993 | McClintock |
| 5,551,781 A | 9/1996 | Wilkes |
| 5,558,438 A | 9/1996 | Warr |
| 5,655,843 A | 8/1997 | Conrad |
| 5,830,543 A | 11/1998 | Miyake et al. |
| 5,836,697 A | 11/1998 | Chiesa |
| 5,855,435 A | 1/1999 | Chiesa |
| 5,902,047 A | 5/1999 | Yeager |
| 5,908,246 A | 6/1999 | Anmura |
| 5,938,013 A | 8/1999 | Palumbo |
| 5,979,655 A | 11/1999 | Tseng |
| 6,047,883 A | 4/2000 | Calvert |
| 6,126,317 A | 10/2000 | Anderson et al. |
| 6,224,262 B1 | 5/2001 | Hogan |
| 6,241,390 B1 | 6/2001 | Schneck |
| 6,315,488 B1 | 11/2001 | Thrall |
| 6,328,472 B1 | 12/2001 | Laurence |
| 6,334,711 B1 | 1/2002 | Risgalla |
| 6,367,976 B1 | 4/2002 | Bannister |
| 6,635,711 B1 | 10/2003 | Miskovic |
| 6,698,928 B2 | 3/2004 | Miller |
| 6,966,134 B2 | 11/2005 | Ngan |
| 7,165,887 B2 | 1/2007 | Strand et al. |
| 7,237,953 B2 | 7/2007 | Healy |
| 7,523,825 B2 | 4/2009 | Velazquez |
| 7,563,027 B2 | 7/2009 | Allen |
| 7,722,255 B2 | 5/2010 | Tessera |
| 7,731,425 B2 | 6/2010 | Lin et al. |
| 8,173,233 B2 | 5/2012 | Rogers |
| 8,297,840 B2 | 10/2012 | Jansen |
| 8,540,427 B2 | 9/2013 | Steele |
| 2003/0040411 A1 | 2/2003 | Alberight |
| 2003/0139516 A1 | 7/2003 | Quinn et al. |
| 2003/0152299 A1 | 8/2003 | Culbertson et al. |
| 2003/0228077 A1 | 12/2003 | Laske |
| 2004/0091648 A1 | 5/2004 | Hartzell et al. |
| 2005/0226542 A1 | 10/2005 | Kendall et al. |
| 2006/0072856 A1 | 4/2006 | Su |
| 2006/0285777 A1 | 12/2006 | Howell |
| 2006/0285781 A1 | 12/2006 | Zoss |
| 2007/0047853 A1 | 1/2007 | Sharp |
| 2007/0047852 A1 | 3/2007 | Sharp |
| 2007/0104905 A1 | 3/2007 | Floyd |
| 2007/0140600 A1 | 6/2007 | Nowak |
| 2007/0292053 A1 | 12/2007 | Lin et al. |
| 2008/0047228 A1 | 2/2008 | Anzini et al. |
| 2008/0187695 A1 | 8/2008 | Nowak |
| 2009/0080813 A1 | 3/2009 | Rasmussen |
| 2009/0136161 A1 | 5/2009 | Hickey |
| 2009/0148081 A1 | 6/2009 | Rogers |
| 2009/0263048 A1 | 10/2009 | Iannelli |
| 2009/0324143 A1 | 12/2009 | Sharp |
| 2010/0029455 A1 | 2/2010 | Skopek |
| 2010/0154362 A1 | 6/2010 | Jansen |
| 2010/0158417 A1 | 6/2010 | Sharp |
| 2010/0158418 A1 | 6/2010 | Jansen |
| 2010/0189380 A1 | 7/2010 | Sargin |
| 2010/0093501 A1 | 8/2010 | Koeningkramer |
| 2010/0209026 A1 | 8/2010 | Koemgkramer |
| 2010/0266223 A1 | 10/2010 | Lin |
| 2010/0270309 A1 | 10/2010 | Files |
| 2010/0278454 A1 | 11/2010 | Huffer |
| 2011/0002560 A1 | 1/2011 | Robles |
| 2011/0019944 A1 | 1/2011 | Sargin |
| 2011/0038569 A1 | 2/2011 | Huffer |
| 2011/0082019 A1 | 4/2011 | Bannister |
| 2011/0147383 A1 | 6/2011 | Soudais et al. |
| 2011/0263400 A1 | 10/2011 | Sargin |
| 2012/0314979 A1 | 12/2012 | Heininga |
| 2013/0206631 A1 | 8/2013 | Bazbaz |
| 2013/0209002 A1 | 8/2013 | Bazbaz |

FOREIGN PATENT DOCUMENTS

| | | |
|---|---|---|
| EP | 1468931 | 10/2004 |
| EP | 1780136 | 5/2007 |
| EP | 2263949 A1 | 12/2010 |
| EP | 2599617 | 6/2013 |
| WO | 9961344 | 12/1999 |
| WO | 2003040411 | 5/2003 |
| WO | 2005030600 | 4/2005 |
| WO | 2008146142 | 12/2008 |
| WO | 2008157681 | 12/2008 |
| WO | 2009016644 | 2/2009 |
| WO | 2009082712 | 7/2009 |
| WO | 20100093501 | 8/2010 |
| WO | 2012040097 | 3/2012 |

(56) References Cited

FOREIGN PATENT DOCUMENTS

| WO | 2012141981 | 10/2012 |
| WO | 2013123015 | 8/2013 |
| WO | 2015103103 | 7/2015 |

EASY ACCESS WOVEN PLASTIC BAGS

CROSS-REFERENCE TO RELATED APPLICATIONS

This application is a continuation of and claims the benefit of priority of U.S. patent application Ser. No. 14/159,737, which was filed on Jan. 21, 2014, and which claims the benefit of priority of U.S. Provisional Patent Application Ser. No. 61/755,322, filed on Jan. 22, 2013, both of which are incorporated herein by reference in its entirety.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present disclosure relates to plastic bags with improved opening features.

2. Background of the Invention

Conventional plastic bags of a wide variety of size and shape are used in various situations. Bulk materials, such as flour, sugar, rice, seed, animal feed, chemicals, powdered materials or the like, for example, typically have been packaged in woven plastic bags in the past. Pet food, bird seed and other products sold in retail stores typically have not been packaged in conventional woven plastic bags. Among other reasons for this, woven plastic bags were considered too rudimentary to be printed with high end graphics suitable for consumer type of packaging. In addition, the high speed requirements in the filling and packaging operations limited the use of the woven bags in these applications.

Laminated woven sacks (LWS) were developed using a woven polypropylene structure laminated to a bi-oriented polypropylene film (BOPP) that can be reverse printed with high end graphics suitable for consumer type of packaging. The LWS provides a stronger, more attractive bag than the more conventional multiwall bags used for that purpose over the last 20 years. Due to their tough strong structure, conventional LWS bags are typically sewn shut on both ends. These LWS recently met with success and have been successfully substituted for the conventional multiwall paper bags used in the pet food industry for many years.

One major drawback of the sewn LWS has been the closing of the bags at high speed filling lines, such as those for filling such bags with pet food. Experience has shown that sewing production lines are typically slower than the filling of the multiwall pinch bottom bags. Additionally, the sewn bags do not provide an aesthetically pleasing and useful clean display on the ends of the bags, thus making it difficult for consumers to identify or find a desired brand quickly when the bags are displayed on the shelves at the point of sale, such as when they are stacked on top of one another. In addition, the sewn ends required puncturing the plastic bags and thus result in a bag that is not sealed, leading to somewhat reduced shelf-life and possible infestation of the contents of the bag.

Woven plastic bags have been used and are conventional for certain applications. An example of a conventional woven plastic bag is provided in U.S. Pat. No. 4,373,979 ("the '979 patent"), issued on Feb. 15, 1983. The '979 patent describes the use of woven strips of highly longitudinally-oriented, high-density polyethylene or polypropylene in a bag construction in which the bag is formed from a seamed tube made of the woven plastic material. The seamed tube has gussets on either side and, when a portion is cut from the rest of the tube, a bag having two open, unsealed ends is provided. The '979 patent describes the use of ultrasonic spot welds to seal portions of a bag made of such woven plastic strips, as opposed to sewing the seams of a bag or using a hot melt adhesive to seal the gusset forming pleat. The '979 patent is hereby incorporated by reference herein. The '979 patent purports to be an improvement for sealing a plastic bag. As noted in the '979 patent, sewing one end tends to take longer, thus adding time to the manufacturing process. In addition, the sewn ends in a conventional bag tend to be a weak portion of the bag, and a likely location for rips, tearing, and subsequent loss of contents during storing, shipping and handling. In addition, such bags may not provide sufficient protection from infestation from vermin and/or insects.

Another example of plastic bags is disclosed in U.S. Patent Application Publication Number US 2010/0029455 A1 ("the '455 publication"), published on Feb. 4, 2010, which describes production of web sections from a flexible web material that is provided with tear-off lines produced by laser beam processing at the distance of the length of the web sections to be formed. The tear-off lines weaken the flexible web material, but do not result in complete separation of the web sections from the web material, which occurs upon tearing the flexible web material. The '455 publication is incorporated by reference herein.

More recently, some types of plastic bags have provided improvements in sealing the ends of the bags. For example, in U.S. Pat. No. 6,800,051 B2 ("the '051 patent"), issued on Oct. 5, 2004, a process for sealing side fold sacks made of plastic film is described. According to the '051 patent, a web of plastic tubular film is cut to provide a staggered detachment along a perforation so that one wall (e.g., the front wall) projects beyond the opposing wall (e.g., the back wall). The projecting portion of the first wall is then folded over and sealed to the opposing wall by means of a plastic adhesive such as a polyurethane adhesive or hot melt. The '051 patent is hereby incorporated by reference herein. However, such bags involve plastic films, not woven plastic materials, and therefore are unable to handle the weight loads of conventional bulk bags made of paper and other materials. Such bags are useful for only certain lightweight contents, such as bread.

There are a variety of conventional ways of providing for reusable openings in bags. For example, U.S. Pat. No. 6,478,465 B1 ("the '465 patent"), issued Nov. 12, 2002, describes a peelable opening in a multiwall, pinched bottom open mouth bag construction. The '465 patent also describes the use of an adhesive layer that can be used so that the bag opening is reclosable. The '465 patent is hereby incorporated by reference herein.

In other types of conventional plastic bags, such as those used in retail and grocery stores, the use of weakened portion provided by one or more perforations in the plastic bag wall is known. A number of approaches have been taken in connection with such bags, including those shown in U.S. Pat. No. 5,188,235 (the '235 patent), issued Feb. 23, 1993, as well as in U.S. Published Patent Application No. 2005/0087542 A1 (the '542 application), published Apr. 28, 2005, U.S. Pat. No. 5,979,655 (the '655 patent), issued Nov. 9, 1999, and U.S. Published Patent Application No. 2006/0072856 (the '856 application), issued Apr. 6, 2006. However, none of these bags are woven bags, let alone bags with multiple layers. The '235 patent, the '655 patent, the '542 application, and the '856 application are hereby incorporated by reference.

Newly developed pinch laminated woven sacks overcome these drawbacks in the filling and closing operations while allowing an attractive graphic display of the bags' ends at the retail outlet and also providing a strong, durable bag which remains sealed. One major disadvantage of the newly developed pinch bottom laminated woven sack, however, is that it does not allow the consumer or purchaser to quickly and easily open the bag without the use of scissors or knives. There is a need for such a pinch bottom laminated woven sack which is easy to open without the use of scissors, knives or other such instruments, and also does not require the use of excessive force.

Typically woven bags are sealed with a single or double fold at each end with tape over the single or double fold, stitching at both ends, or a zipper at one end and a single or double fold at the other end. However, opening woven bags has proven difficult, due to the strength of the bag. Therefore, what is needed are woven bags that are easier to open, that do not add much to the cost or time to manufacture, and are not susceptible to inadvertent tearing, punctures, breaking, or the like.

SUMMARY OF THE INVENTION

The present disclosure provides woven plastic bags comprising a weakened portion, which makes the presently disclosed woven plastic bags easier to open than conventional woven plastic bags.

The present disclosure provides a bag comprising a front wall, a back wall, a first side wall, a second side wall, an interior surface, an exterior surface, a top end, a bottom end, a first layer and a second layer, each of the front wall, back wall, first side wall and second side wall having an interior surface, an exterior surface, a top end and a bottom end, wherein the first layer comprises a woven polymer and the second layer comprises a polymer or paper attached to the first layer, and wherein the bag comprises a weakened area located on the front wall of the bag, the first side wall of the bag and the back wall of the bag proximal the top end of the bag. In some embodiments the first layer comprises polypropylene, high density polyethylene, low density polyethylene, polyester, or any combination thereof. In other embodiments the second layer comprises a film. In still other embodiments the second layer comprises polypropylene, polyethylene, polyethylene terephthalate, polyamide, or any combination thereof or paper. In yet other embodiments the second layer comprises oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, coated paper or any combination thereof. In further embodiments at least a portion of the second layer comprises a printed area thereon. In still further embodiments the first layer and second layer are laminated together. In yet further embodiments the first layer and second layer are laminated together using adhesive lamination or extrusion lamination.

In additional embodiments the weakened area comprises a plurality of perforations that penetrate through at least a portion of the front wall of the bag, the first side wall of the bag and the back wall of the bag. In some embodiments the plurality of perforations forms a line. In various embodiments the plurality of perforations forms a line that extends from any position on the front wall of the bag, for example about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 97%, about 98% or about 99% of a distance across the front wall of the bag, across the first side wall of the bag, to any position on the back wall of the bag, for example about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 97%, about 98% or about 99% of a distance across the back wall of the bag. In other embodiments the plurality of perforations forms a wave pattern. In further embodiments the plurality of perforations forms a zigzag pattern. In still further embodiments the weakened area comprises a deformation in least a portion of the front wall of the bag, the first side wall of the bag and the back wall of the bag. In yet further embodiments the weakened area further comprises a scoring mark. In certain embodiments each of the first layer and the second layer of the bag comprise a weakened portion. In still other embodiments the back wall of the bag comprises a seam.

In certain embodiments the top end of the back wall projects further than the top end of a portion of the first side wall proximal to the back wall and the top end of a portion of the second side wall proximal to the back wall, the top end of a portion of the first side wall proximal to the back wall and the top end of a portion of the second side wall proximal to the back wall projects further than the top end of a portion of the first side wall proximal to the front wall and the top end of a portion of the second side wall proximal to the front wall, and the top end of a portion of the first side wall proximal to the front wall and the top end of a portion of the second side wall proximal to the front wall projects further than the top end of the front wall. In other embodiments at least a portion of the bottom end of the front wall projects further than the bottom end of a portion of the first side wall proximal to the front wall and the bottom end of a portion of the second side wall proximal to the front wall, the bottom end of a portion of the first side wall proximal to the front wall and the bottom end of a portion of the second side wall proximal to the front wall project further than the bottom end of a portion of the first side wall proximal to the back wall and the bottom end of a portion of the second side wall proximal to the back wall, and the bottom end of a portion of the first side wall proximal to the back wall and the bottom end of a portion of the second side wall proximal to the back wall project further than the bottom end of the rear wall. In further embodiments the top end of a portion of the first side wall proximal to the back wall and the top end of a portion of the first side wall proximal to the front wall are separated by an angled cut, and the bottom end of a portion of the first side wall proximal to the back wall and the bottom end of a portion of the first side wall proximal to the front wall are separated by an angled cut.

In additional embodiments the portion of the bottom end of the front wall that projects further than the bottom end of the first side wall and the bottom end of the second side wall, and the portion of the bottom end of the first side wall and the bottom end of the second side wall that project further than the bottom end of the rear wall are sealed to the outer surface of the bottom end of the rear wall. In certain embodiments the bottom end of the bag is sealed using an adhesive sealing, heat sealing, adhesive lamination, extrusion lamination, stitching, ultrasonic energy, pressure, tape, or any combination thereof. In some embodiments the bottom end of the bag is sealed using adhesive-to-adhesive sealing or adhesive-to-bag sealing. In further embodiments the bottom end of the front wall, the bottom end of the first side wall, the bottom end of the rear wall and the bottom end of the second side wall each project the same distance. In still further embodiments at least a portion of a single fold of the bottom end of the bag is sealed to the outer surface of the front wall or the outer surface of the rear wall of the bag. In yet further embodiments at least a portion of a double fold of the bottom end of the bag is sealed to the outer surface of the front wall or the outer surface of the rear wall of the bag.

In other embodiments the top end of the front wall, the top end of the first side wall, the top end of the rear wall and the top end of the second side wall each project the same distance. In certain embodiments at least a portion of the bottom end of the front wall projects further than the bottom end of a portion of the first side wall proximal to the front wall and the bottom end of a portion of the second side wall proximal to the front wall, the bottom end of a portion of the first side wall proximal to the front wall and the bottom end of a portion of the second side wall proximal to the front wall project further than the bottom end of a portion of the first side wall proximal to the back wall and the bottom end of a portion of the second side wall proximal to the back wall, and the bottom end of a portion of the first side wall proximal to the back wall and the bottom end of a portion of the second side wall proximal to the back wall project further than the bottom end of the rear wall. In still other embodiments the portion of the bottom end of the front wall that projects further than the bottom end of the first side wall and the bottom end of the second side wall, and the portion of the bottom end of the first side wall and the bottom end of the second side wall that project further than the bottom end of the rear wall are sealed to the outer surface of the bottom end of the rear wall. In additional embodiments the bottom end of the front wall, the bottom end of the first side wall, the bottom end of the rear wall and the bottom end of the second side wall each project the same distance. In certain embodiments the top end and the bottom end of the bag are sealed, and wherein the bag comprises at least ten pounds by weight of a filling material.

In some embodiments the bag further comprises a third layer comprising a polymer between the first layer and the second layer. In certain embodiments the third layer comprises a woven polymer. In other embodiments the third layer comprises polypropylene, high density polyethylene, low density polyethylene, polyester, or any combination thereof. In further embodiments the third layer comprises a polymeric film. In additional embodiments the third layer comprises polypropylene, polyethylene, polyethylene terephthalate, polyamide, or any combination thereof. In still other embodiments each of the first layer, the second layer and the third layer of the bag comprise a weakened portion.

In further embodiments the bag comprises printing on the front wall, the first side wall, the back wall, the second side wall, the first end, the second end, or any combination thereof. In still further embodiments at least portions of the exterior surfaces of each of the front wall and the back wall comprise a plurality of discrete areas further comprising printing thereon. In yet further embodiments a portion of the front wall and a portion of the back wall combine to form a discrete portion of the bag located at or near either the top end or the bottom end, wherein the discrete portion of the bag comprises printing thereon.

These and other objects of the invention will be apparent to those skilled in the art from the following detailed description.

BRIEF DESCRIPTION OF THE DRAWINGS

The following drawings are included to further demonstrate certain aspects and embodiments of the present invention. The invention may be better understood by reference to one or more of these drawings in combination with the detailed description of specific embodiments presented herein.

DETAILED DESCRIPTION OF THE PREFERRED EMBODIMENT

Figure 1:
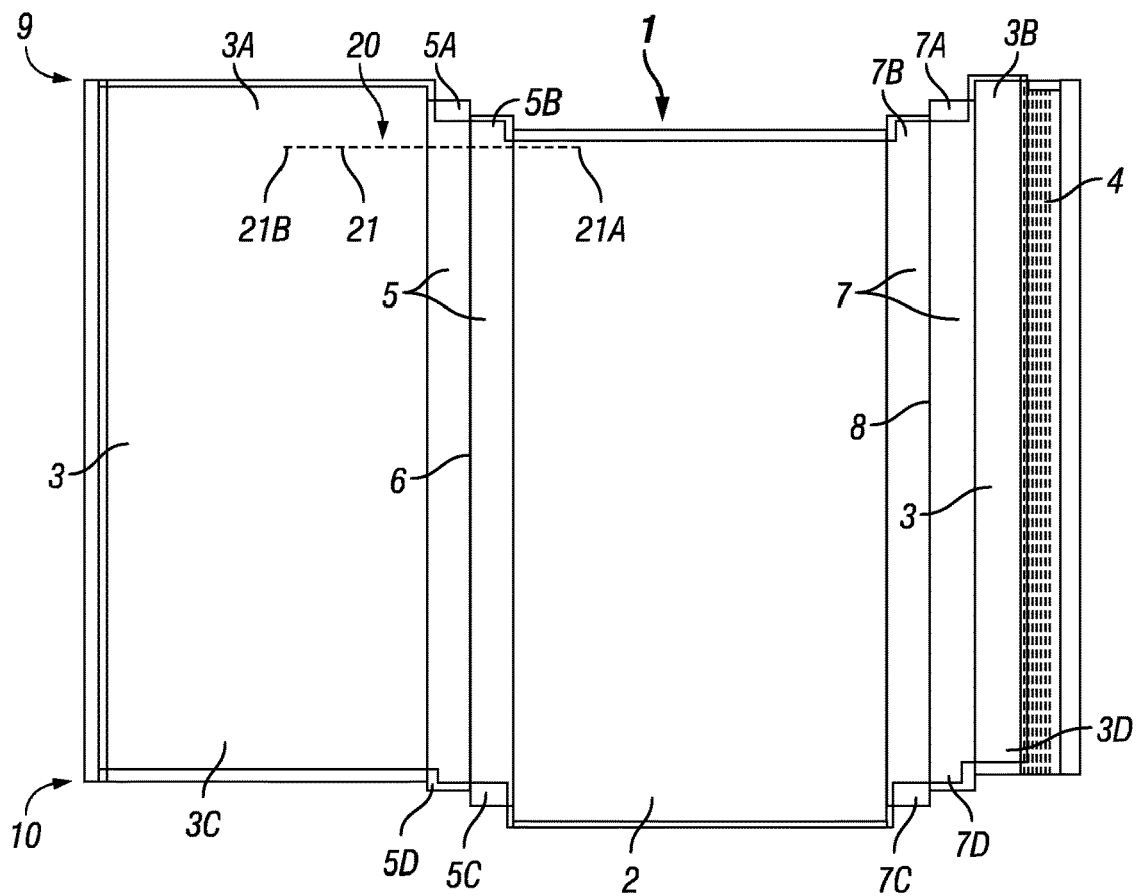
FIG. 1 shows an outline of a step cut bag with a weakened area near the top end of the bag comprising a line of perforations extending from the front panel of the bag across the first side panel of the bag to the back panel of the bag according to one embodiment of the present disclosure.

Referring to FIG. 1, a planar view of an embodiment of a substantially flat sheet of material from which a "step cut" bag 1 is to be formed is shown. Shown on the sheet are front wall 2, rear wall 3, seam 4, first side wall 5 having gusset portion 6, and second side wall 7 having gusset portion 8. As shown in FIG. 1, the bag 1 has a first or top end 9 and a second or bottom end 10, and thus each of the front wall 2, rear wall 3, first side wall 5 and second side wall 7 has a first or top end a second or bottom end. It will be apparent, however, that the orientation of the bag ends 9 and 10 are unimportant and the "top" and "bottom" references are useful but may change depending upon the orientation from which one views the bag. Bag 1 is considered a "step cut" bag because the front wall 2, the first side wall 5 and the second side wall 7, and the rear wall 3 are cut so that the front wall 2, the first side wall 5 and the second side wall 7, and the rear wall 3 have different lengths on one end (or both ends) of the bag. As shown in FIG. 1, the first side wall 5 and the second side wall 7 are cut to different lengths on either side of the gusset portion 6 and 8, respectively. As shown in FIG. 1 the first end 9 of bag 1 has portions 3a and 3b of the rear wall 3 of the bag that extend further from the body of the bag 1 than do portions 5a and 7a of the first side wall 5 and second side wall 7, respectively, which in turn extend further from the body of the bag 1 than do portions 5b and 7b of the first side wall 5 and second side wall 7, respectively, which in turn extend further from the body of the bag 1 than does the top end of the front wall 2 of the bag 1. In addition, the bottom end of the front wall 2 at the second end 10 of bag 1 extends further from the body of the bag 1 than do portions 5c and 7c of the first side wall 5 and second side wall 7, respectively, which in turn extend further from the body of the bag 1 than do portions 5d and 7d of the first side wall 5 and second side wall 7, respectively, which in turn extend further from the body of the bag 1 than do portions 3c and 3d the bottom end of the rear wall 3 of the bag 1. Therefore, in the embodiment shown in FIG. 1 both of the ends of the bag 1 have a "step cut." Also shown is weakened portion 20, which in this embodiment is near the first end 9 of the bag 1 and comprises a plurality of perforations 21 extending from a first end 21a on the front wall 2 of the bag 1 across the first side wall 5 of the bag 1 to a second end 21b on the rear wall 3 of the bag 1. The weakened area is generally on or near the fold line (not shown) for closing or sealing the first end 9 of the bag 1. This weakened portion can be opened with less force than required to open or tear other portions of the bag 1.

Figure 2:
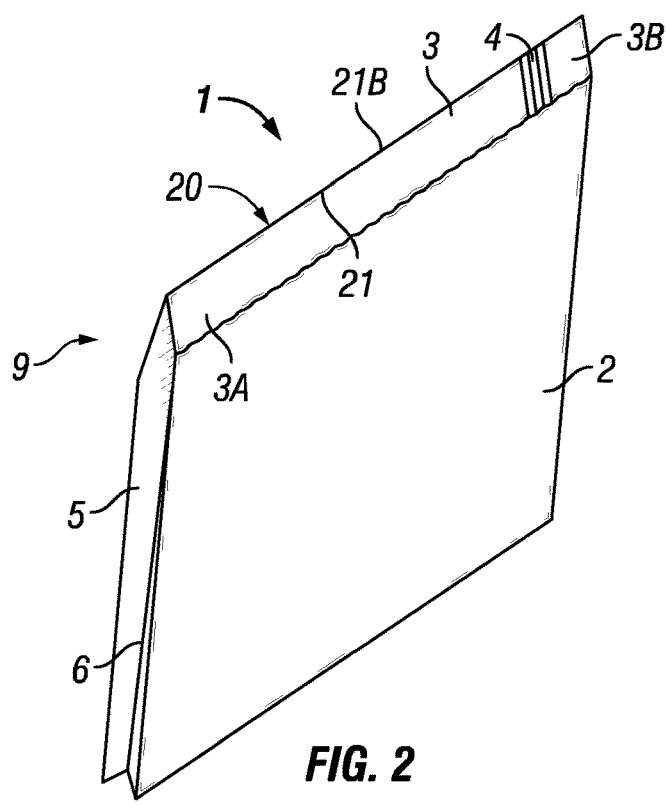
FIG. 2 shows the top portion of the bag of FIG. 1 after closing the top end of the bag.
Figure 3:
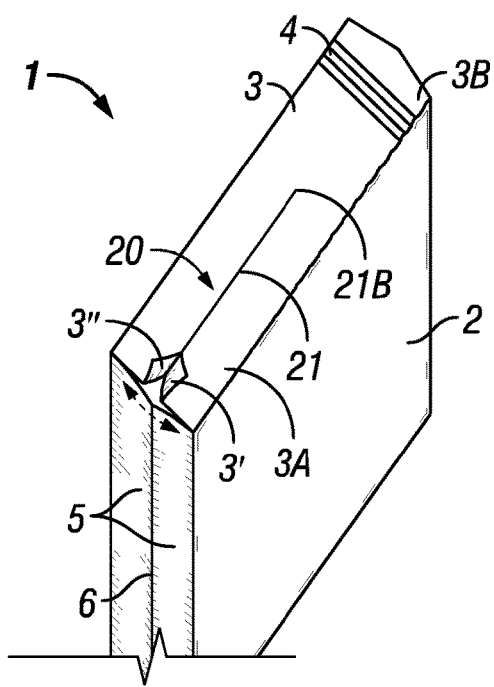
FIG. 3 shows the first step in opening the closed bag from FIG. 2.

Referring to FIG. 2, the upper portion of the bag 1 from FIG. 1 is shown after sealing the first end 9 of the bag 1. Visible in FIG. 2 is front wall 2, back wall 3 having portions 3a and 3b, seam 4, first side wall 5 having gusset portion 6, and weakened portion 20 comprising a plurality of perforations 21 terminating at second end 21b.

Figure 4:
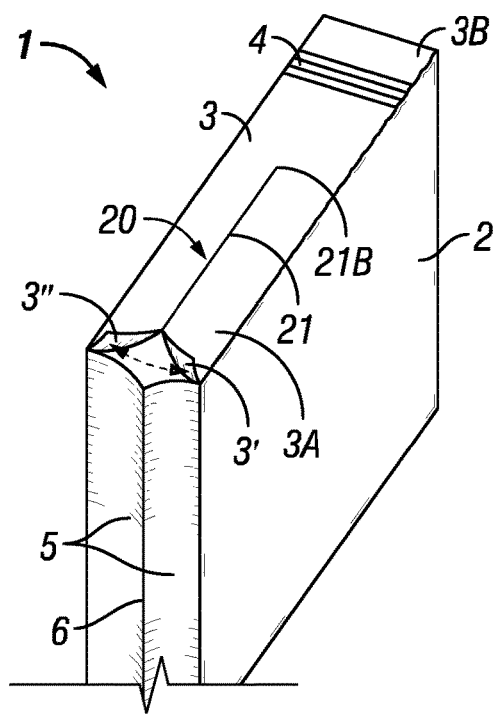
FIG. 4 shows the second step in opening the closed bag from FIG. 2.
Figure 5:
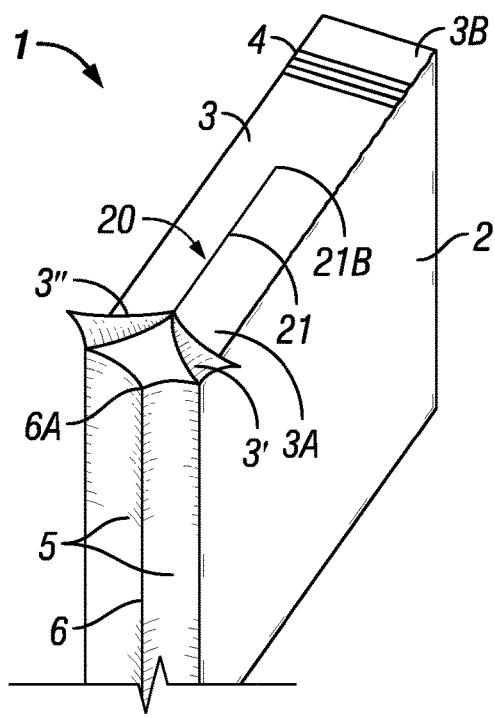
FIG. 5 shows the third step in opening the closed bag from FIG. 2.
Figure 6:
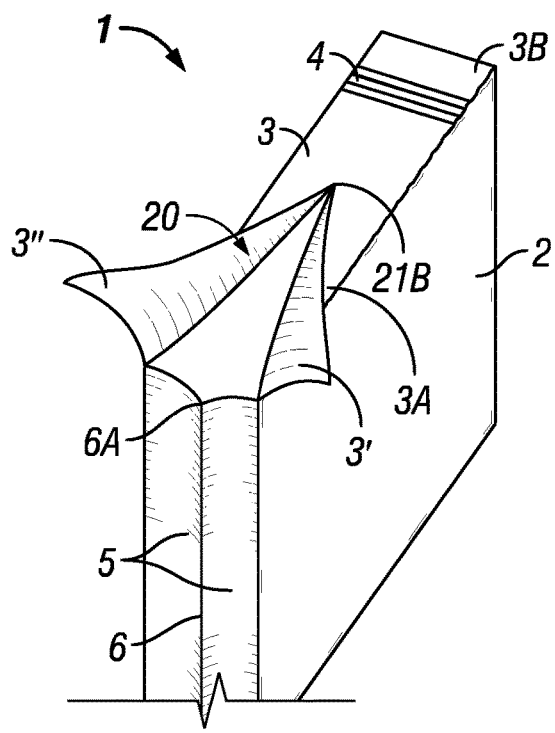
FIG. 6 shows the fourth step in opening the closed bag from FIG. 2.

Bag 1 can be opened as shown in FIG. 3 through FIG. 6. FIG. 3 once again shows the upper portion of the bag 1 from FIG. 2, and visible is front wall 2, back wall 3 having portions 3a and 3b, seam 4, first side wall 5 having gusset portion 6, and weakened portion 20 comprising a plurality of perforations 21 terminating at second end 21b. Bag 1 is opened by initially pulling on the portions 3' and 3" of the rear wall 3 on both sides of the plurality of perforations 21, which creates a tear in the weakened portion 20 of the bag 1 and begins separating the portions of the first side wall 5 that are separated by the gusset portion 6. In FIG. 4 the portions 3' and 3" of the rear wall 3 on both sides of the plurality of perforations 21 are further pulled apart, resulting in the expansion of the tear in the weakened portion 20 toward the second end 21b of the plurality of perforations 21. Additionally visible in FIG. 4 are front wall 2, back wall 3 having portions 3a and 3b, seam 4, and first side wall 5 having gusset portion 6. In FIG. 5 the portions 3' and 3" of the rear wall 3 on both sides of the plurality of perforations 21 are pulled completely apart, resulting in the expansion of the tear in the weakened portion 20 further toward the second end 21b of the plurality of perforations 21 and to the first end 21a of the plurality of perforations (not visible in FIG. 5). This results in uncovering the top end 6a of the gusset portion 6 of the first side wall 5, which can then be pulled open. Additionally visible in FIG. 5 are front wall 2, back wall 3 having portions 3a and 3b, and seam 4. In FIG. 6 the plurality of perforations 21 are pulled completely apart, resulting in the expansion of the tear in the weakened portion 20 to the second end 21b of the plurality of perforations 21. This results in a large opening in bag 1 that can be used to pour out the contents of the bag 1. Additionally visible in FIG. 6 are front wall 2, back wall 3 having portions 3a, 3b, 3' and 3", seam 4, first side wall 5 and gusset portion 6 having a top end 6a.

Figure 7:
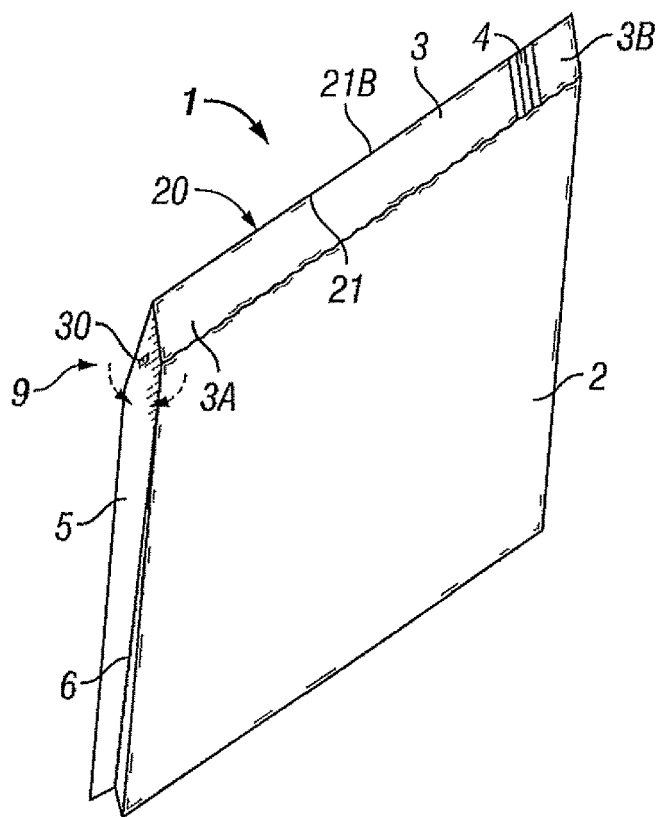
FIG. 7 shows the top portion of the bag of FIG. 1 after closing the top end of the bag and a location for optional application of adhesive to keep the top portion of the gusseted portion of the first side panel closed.

Referring to FIG. 7, the upper portion of the bag 1 from FIG. 1 is shown after sealing the first end 9 of the bag 1, with optional adhesive 30 located near the top end of the first side wall 5, which serves to keep the top end of the first side wall 5 closed (see arrows). Although not visible in FIG. 7, the optional adhesive can also be applied near the top end of the second side wall. Although shown as a spot in FIG. 7, the adhesive can be applied in any manner that results in the closure of the top end of the first side wall 5, for example as a strip that runs from the edge of the intersection of the first side wall 5 and the back wall 3 to the edge of the intersection of the first side wall 5 and the front wall 2. Also visible in FIG. 7 is front wall 2, back wall 3 having portions 3a and 3b, seam 4, first side wall 5 having gusset portion 6, and weakened portion 20 comprising a plurality of perforations 21 terminating at second end 21b.

Once the bag 1 is sealed at one end, it can be filled with the desired materials. For example, it has been found that a bag 1 with dimensions of 16.5 inches by 6.5 inches by 39.5 inches can durably hold up to about fifty five (55) pounds of material without showing undue stress, undue tearing, undue breakage, undue deformation, or leakage or the like. It is believed that any bulk material can be contained by bag 1, and in certain embodiments the contents can weigh up to 100 pounds or so without undue risk of tearing or damage to bag 1. Once the bag 1 is filled, the second end typically needs to be sealed. The second end of the bag 1 can be sealed in a similar manner as that described above. Alternatively, the bag 1 can have its second end sealed by conventional means such as sewing. Still another approach is to stitch the second end, and then seal the second end in a manner like that described above (not shown). Although not shown, those skilled in the art will understand and appreciate that a second end of bag 1 can be sealed using any conventional technique once bag 1 has been filled with the selected amount of the desired material.

Figure 8:
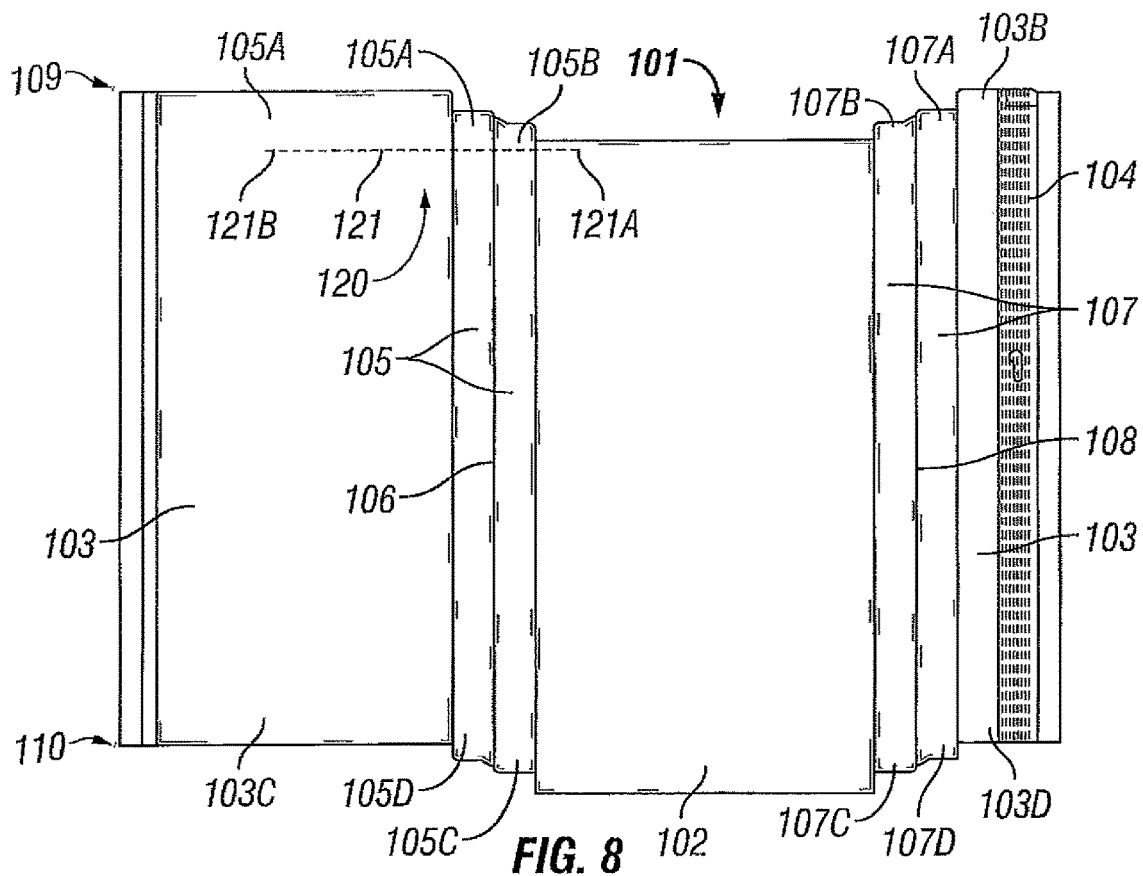
FIG. 8 shows an outline of a step cut bag with a weakened area near the top end of the bag comprising a line of perforations extending from the front panel of the bag across the first side panel of the bag to the back panel of the bag, and angled corners at the top and bottom of the portions of the first and second side panels on either side of the gusset fold, according to one embodiment of the present disclosure.

Referring to FIG. 8, a planar view of an embodiment of a substantially flat sheet of material from which a "step cut" bag 101 is to be formed is shown. Shown on the sheet are front wall 102, rear wall 103, seam 104, first side wall 105 having gusset portion 106, and second side wall 107 having gusset portion 108. As shown in FIG. 8, the bag 101 has a first or top end 109 and a second or bottom end 110, and thus each of the front wall 102, rear wall 103, first side wall 105 and second side wall 107 has a first or top end and a second or bottom end. It will be apparent, however, that the orientation of the bag ends 109 and 110 are unimportant and the "top" and "bottom" references are useful but may change depending upon the orientation from which one views the bag. Bag 101 is considered a "step cut" bag because the front wall 102, the first side wall 105 and the second side wall 107, and the rear wall 103 are cut so that the front wall 102, the first side wall 105 and the second side wall 107, and the rear wall 103 have different lengths on one end (or both ends) of the bag. As shown in FIG. 8, the first side wall 105 and the second side wall 107 are cut to different lengths on either side of the gusset portion 106 and 108, respectively. As shown in FIG. 8 the first end 109 of bag 101 has portions 103a and 103b of the rear wall 103 of the bag that extend further from the body of the bag 101 than do portions 105a and 107a of the first side wall 105 and second side wall 107, respectively, which in turn extend further from the body of the bag 101 than do portions 105b and 107b of the first side wall 105 and second side wall 107, respectively, which in turn extend further from the body of the bag 101 than does the top end of the front wall 102 of the bag 101. In addition, the bottom end of the front wall 102 at the second end 110 of bag 101 extends further from the body of the bag 101 than do portions 105c and 107c of the first side wall 105 and second side wall 107, respectively, which in turn extend further from the body of the bag 101 than do portions 105d and 107d of the first side wall 105 and second side wall 107, respectively, which in turn extend further from the body of the bag 101 than do portions 103c and 103d the bottom end of the rear wall 103 of the bag 101. Therefore, in the embodiment shown in FIG. 8 both of the ends of the bag 101 have a "step cut." In addition, the portions 105a and 105b, 107a and 107b, 105c and 105d, and 107c and 107d are not separated by a straight line, but rather an angled cut (see circles). Although in FIG. 8 this cut is shown as about 45°, the angle can vary in different embodiments (not shown). This angled cut serves to further prevent leakage of contents out of the bag, or infestation of organisms into the contents of the bag. Also shown is weakened portion 120, which in this embodiment is near the first end 109 of the bag 101 and comprises a plurality of perforations 121 extending from a first end 121a on the front wall 102 of the bag 101 across the first side wall 105 of the bag 101 to a second end 121b on the rear wall 103 of the bag 101. The weakened area is generally on or near the fold line (not shown) for closing or sealing the first end 109 of the bag 101. This weakened portion can be opened with less force than required to open or tear other portions of the bag 101.

Figure 9:
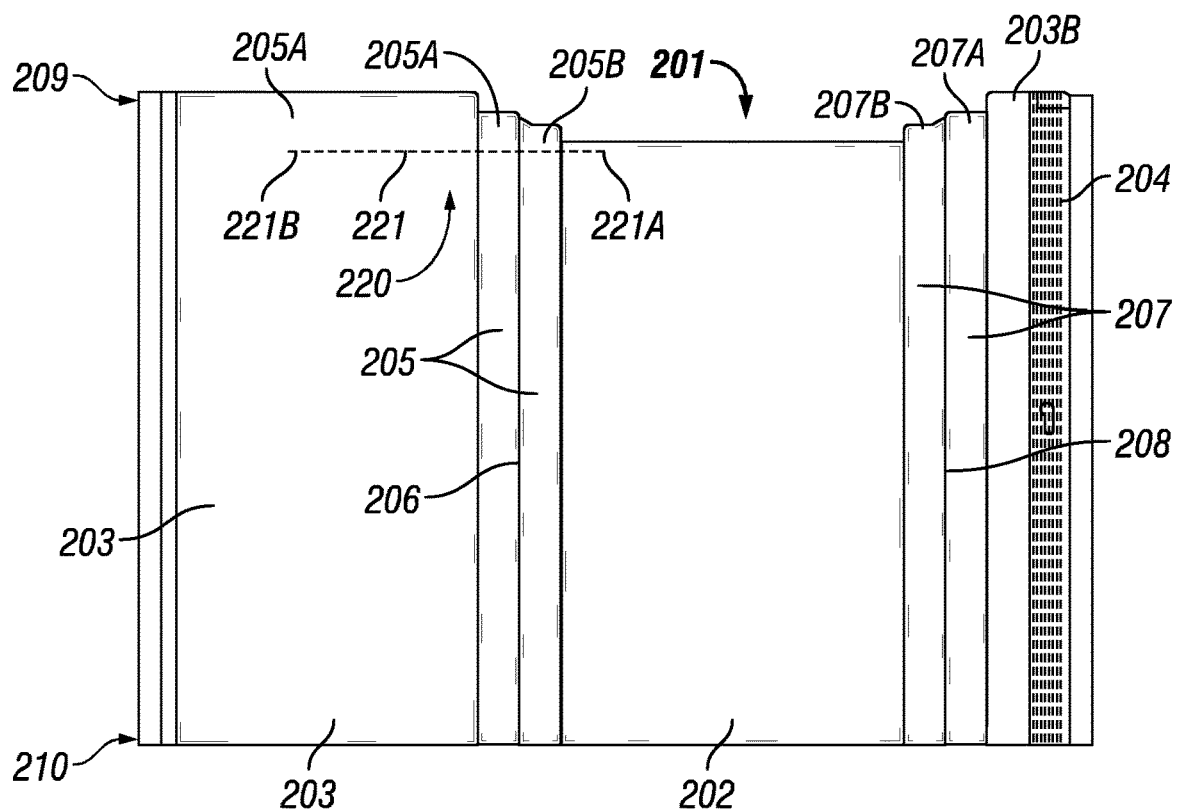
FIG. 9 shows an outline of a bag with a step cut top end and a flush cut bottom end, and a weakened area near the top end of the bag comprising a line of perforations extending from the front panel of the bag across the first side panel of the bag to the back panel of the bag according to one embodiment of the present disclosure.

Referring to FIG. 9, a planar view of an embodiment of a substantially flat sheet of material from which a bag 201 is to be formed is shown. Shown on the sheet are front wall 202, rear wall 203, seam 204, first side wall 205 having gusset portion 206, and second side wall 207 having gusset portion 208. As shown in FIG. 9, the bag 201 has a first or top end 209 and a second or bottom end 210, and thus each of the front wall 202, rear wall 203, first side wall 205 and second side wall 207 has a first or top end and a second or bottom end. It will be apparent, however, that the orientation of the bag ends 209 and 210 are unimportant and the "top" and "bottom" references are useful but may change depending upon the orientation from which one views the bag. The top end 209 of bag 201 is has a "step cut" because the front wall 202, the first side wall 205 and the second side wall 207, and the rear wall 203 are cut so that the front wall 202, the first side wall 205 and the second side wall 207, and the rear wall 203 have different lengths. As shown in FIG. 9, the first side wall 205 and the second side wall 207 are cut to different lengths on either side of the gusset portion 206 and 208, respectively. As shown in FIG. 9 the first end 209 of bag 201 has portions 203a and 203b of the rear wall 203 of the bag 201 that extend further from the body of the bag 201 than do portions 205a and 207a of the first side wall 205 and second side wall 207, respectively, which in turn extend further from the body of the bag 201 than do portions 205b and 207b of the first side wall 205 and second side wall 207, respectively, which in turn extend further from the body of the bag 201 than does the top end of the front wall 202 of the bag 201. In the embodiment shown in FIG. 9, the bottom end of the front wall 202, the first side wall 205, the second side wall 207, and the rear wall 203 at the second end 210 of bag 201 each extend the same distance from the body of the bag 201. Therefore, in the embodiment shown in FIG. 9 the bottom end 210 of the bag 201 has a "flush cut." Although not shown, in certain embodiments the top end of the bag can be flush cut, and the bottom end of the bag can be step cut. Also shown is weakened portion 220, which in this embodiment is near the first end 209 of the bag 201 and comprises a plurality of perforations 221 extending from a first end 221a on the front wall 202 of the bag 201 across the first side wall 205 of the bag 201 to a second end 221b on the rear wall 203 of the bag 201. The weakened area is generally on or near the fold line (not shown) for closing or sealing the first end 209 of the bag 201. This weakened portion can be opened with less force than required to open or tear other portions of the bag 201.

Figure 10:
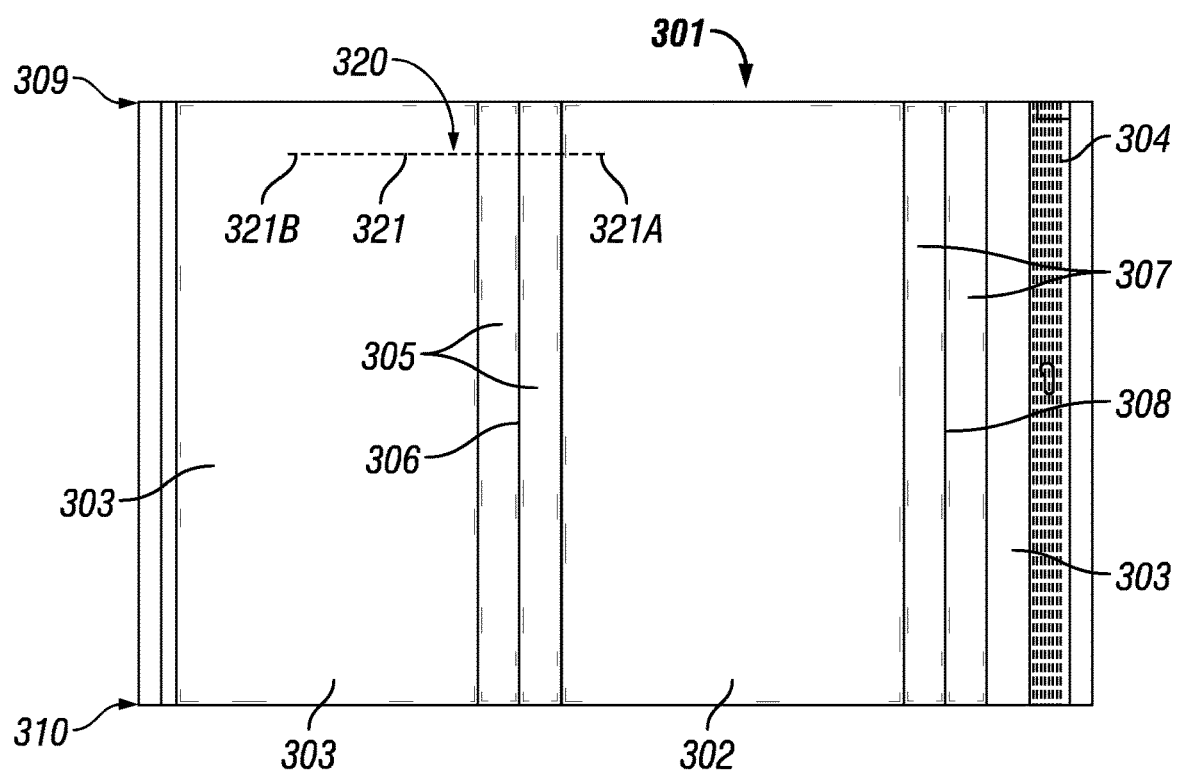
FIG. 10 shows an outline of a bag with a flush cut top end and a flush cut bottom end, and a weakened area near the top end of the bag comprising a line of perforations extending from the front panel of the bag across the first side panel of the bag to the back panel of the bag according to one embodiment of the present disclosure.

Referring to FIG. 10, a planar view of an embodiment of a substantially flat sheet of material from which a flush cut bag 301 is to be formed is shown. Shown on the sheet are front wall 302, rear wall 303, seam 304, first side wall 305 having gusset portion 306, and second side wall 307 having gusset portion 308. As shown in FIG. 10, the bag 301 has a first or top end 309 and a second or bottom end 310, and thus each of the front wall 302, rear wall 303, first side wall 305 and second side wall 307 has a first or top end and a second or bottom end. It will be apparent, however, that the orientation of the bag ends 309 and 310 are unimportant and the "top" and "bottom" references are useful but may change depending upon the orientation from which one views the bag. The top end 309 of bag 301 has a "flush cut" because the front wall 302, the first side wall 305 and the second side wall 307, and the rear wall 303 are cut to the same length. In the embodiment shown in FIG. 10, the bottom end of the front wall 302, the first side wall 305, the second side wall 307, and the rear wall 303 at the second end 310 of bag 301 each extend the same distance from the body of the bag 301. Therefore, in the embodiment shown in FIG. 10 the bottom end 310 of the bag 301 also has a "flush cut." Also shown is weakened portion 320, which in this embodiment is near the first end 309 of the bag 301 and comprises a plurality of perforations 321 extending from a first end 321a on the front wall 302 of the bag 301 across the first side wall 305 of the bag 301 to a second end 321b on the rear wall 303 of the bag 301. The weakened area is generally on or near the fold line (not shown) for closing or sealing the first end 309 of the bag 301. This weakened portion can be opened with less force than required to open or tear other portions of the bag 301.

Those skilled in the art will understand and appreciate that the bag according to the invention may vary in size, dimensions, and shape without departing from the scope of the invention, and that the foregoing description of the preferred embodiments is not intended to limit the scope of the invention as defined by the claims. For example, those skilled in the art will understand and appreciate that the foregoing bag 1 can have sealed and sewn ends in a tubular bag with side gussets as shown, or a block bottom and top, or a combination thereof, although not shown. Those skilled in the art will also appreciate that a weakened portion or area can be provided in a number of ways that may vary from those expressly described and shown, such as by stressing portions of the bag wall with or without deforming or perforating same, as well as varying the size, number, depth, and/or pattern of perforations and/or deformations in a bag wall. Similarly, those skilled in the art will understand that the bag 1 may be provided with a re-usable opening (not shown). Such features are conventional with prior art bags. Similarly, those skilled in the art will appreciate that terms such as "front" and "rear," and "top" and "bottom," are useful in describing a bag, but essentially depend on a bag's orientation when such terms are used, and are therefore not limiting as to a bag's orientation.

We claim:

1. A bag comprising:
    a front wall, a back wall, a first side wall further comprising a first gusset, a second side wall further comprising a second gusset, a top end, and a bottom end;
    wherein each of the front wall, the back wall, the first side wall, and the second side wall respectively further comprise: an interior surface, an exterior surface, a top end, and a bottom end;
    wherein each of the front wall, the back wall, the first side wall, and the second side wall comprise a first layer and a second layer, with the first layer and second layer laminated together;
    wherein the first layer comprises woven polymer strips consisting essentially of oriented polypropylene, and the second layer comprises an oriented polymer film consisting essentially of polypropylene;
    wherein the bag further comprises a plurality of perforations proximal the top end of the bag that define a line parallel to the top end of the bag, the line extending from a point on the front wall of the bag, across the first side wall of the bag, and to a point on the back wall of the bag;
    wherein each of the plurality of perforations penetrates through at least a portion of the first layer or a portion of the second layer;
    wherein the top end of the back wall extends further than a first portion of the first side wall and the second side wall at respective top ends, the first portion being proximal to the back wall;
    wherein the first portion of the first side wall and the second side wall extends further than a second portion of the first side wall and the second side wall at respective top ends, the second portion being proximal to the front wall;
    wherein the second portion of the first side wall and the second side wall extends further than the top end of the front wall; and
    wherein the first portion of the first side wall and the second portion of the first side wall are separated by a first angled cut, and the first portion of the second side wall and the second portion of the second side wall are separated by a second angled cut.

2. The bag according to claim 1, wherein at least a portion of the exterior surfaces comprises a printed area.

3. The bag according to claim 1, wherein the first layer and the second layer are laminated together using adhesive lamination.

4. The bag according to claim 1, wherein the first layer and the second layer are laminated together using extrusion lamination.

5. The bag according to claim 1, wherein the line extends from 20% of a first length across the front wall of the bag and the first side wall of the bag to 50% of a second length of a width of the back wall of the bag.

6. The bag according to claim 1, wherein the bag further comprises a deformation in the front wall of the bag, the first side wall of the bag and the back wall of the bag.

7. The bag according to claim 6, wherein the bag further comprises a scoring mark.

8. The bag according to claim 1, wherein the back wall of the bag comprises a seam.

9. The bag according to claim 1, wherein each of the front wall, the back wall, the first side wall, and the second side wall are formed using a third layer between the first layer and the second layer, the third layer laminating the first layer to the second layer.

10. The bag accordingly to claim 9, wherein each of the plurality of perforations penetrates through at least a portion of the third layer.

11. The bag according to claim 9, wherein the third layer comprises a polymer film consisting essentially of polypropylene.

12. The bag according to claim 1, wherein a first portion of the front wall, at the bottom end of the front wall, extends further than a third portion of the first side wall and the second side wall, respectively, the third portion being at the bottom end and proximal to the front wall;
    wherein the third portion of the first side wall and the second side wall extends further than a fourth portion of the first side wall and the second side wall, respectively, the fourth portion being at the bottom end and proximal to the back wall; and
    wherein the fourth portion of the first side wall and the second side wall, respectively, extends further than the bottom end of the back wall.

13. The bag according to claim 12, wherein the third portion and the fourth portion of the first side wall are separated by a third angled cut; and
    wherein the third portion and the fourth portion of the second side wall are separated by a fourth angled cut.

14. The bag according to claim 12, wherein the first portion of the front wall, and the third portion of the first side wall and the second side wall are joined to the exterior surface of the back wall using a sealing operation.

15. The bag according to claim 1, wherein a first portion of the front wall, at the bottom end of the front wall, extends further than a third portion of the first side wall and the second side wall, respectively, the third portion being at the bottom end and proximal to the front wall;
    wherein the third portion of the first side wall and the second side wall and a fourth portion of the first side wall and the second side wall, respectively, extend the same distance,
    the fourth portion being at the bottom end and proximal to the back wall; and wherein the fourth portion of the first side wall and the second side wall, respectively, extends further than the bottom end of the back wall.

16. The bag according to claim 1 wherein the plurality of perforations enables opening the bag by tearing the plurality of perforations using less force than tearing other portions of the bag.

17. A bag comprising:
    a front wall, a back wall, a first side wall further comprising a first gusset, a second side wall further comprising a second gusset, a top end, and a bottom end;
    wherein each of the front wall, the back wall, the first side wall, and the second side wall respectively further comprise: an interior surface, an exterior surface, a top end, and a bottom end;

wherein each of the front wall, the back wall, the first side wall, and the second side wall comprise a first layer and a second layer;

wherein the first layer comprises woven polymer strips consisting essentially of oriented polyethylene, the second layer comprises an oriented polymer film consisting essentially of polyethylene, and the first layer and the second layer are laminated together;

wherein the bag further comprises a plurality of perforations located on the front wall of the bag, the first side wall of the bag, and the back wall of the bag, proximal the top end of the bag;

wherein each of the plurality of perforations penetrates through at least a portion of the first layer or a portion of the second layer;

wherein the plurality of perforations define a line that is parallel to the top end of the bag, the line extending from a point on the front wall of the bag, across the first side wall of the bag, and to a point on the back wall of the bag;

wherein the top end of the back wall extends further than a first portion of the first side wall and the second side wall at respective top ends, the first portion being proximal to the back wall;

wherein the first portion of the first side wall and the second side wall extends further than a second portion of the first side wall and the second side wall at respective top ends, the second portion being proximal to the front wall;

wherein the second portion of the first side wall and the second side wall extends further than the top end of the front wall; and wherein the first portion of the first side wall and the second portion of the first side wall are separated by a first angled cut, and the first portion of the second side wall and the second portion of the second side wall are separated by a second angled cut.

18. The bag according to claim 17, wherein each of the front wall, the back wall, the first side wall, and the second side wall comprise a third layer between the first layer and the second layer, the third layer laminating the first layer to the second layer.

19. The bag accordingly to claim 18, wherein each of the plurality of perforations penetrates through at least a portion of the third layer.

20. The bag according to claim 18, wherein the third layer comprises a polymer film consisting essentially of polyethylene.

21. The bag according to claim 17, wherein the plurality of perforations enables opening the bag by tearing the plurality of perforations using less force than tearing other portions of the bag.

* * * * *